(12) United States Patent
Spevak

(10) Patent No.: US 9,255,781 B2
(45) Date of Patent: Feb. 9, 2016

(54) METHOD AND SYSTEM FOR DETERMINING PROXIMITY OF AN OBJECT

(71) Applicant: Texas Instruments Deutschland, GMBH, Freising (DE)

(72) Inventor: Peter Spevak, Moosburg a.d. Isar (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 233 days.

(21) Appl. No.: 13/852,453

(22) Filed: Mar. 28, 2013

(65) Prior Publication Data

US 2014/0292356 A1    Oct. 2, 2014

(51) Int. Cl.
*G01R 27/26* (2006.01)
*G01B 7/14* (2006.01)
*G01B 7/02* (2006.01)

(52) U.S. Cl.
CPC . *G01B 7/14* (2013.01); *G01B 7/023* (2013.01)

(58) Field of Classification Search
CPC ...... G01B 7/14; G01B 7/023; G01R 27/2605; G01R 31/312; G06F 3/044; G06F 3/0416; G06F 3/041; G06F 3/03547; G06F 3/016; G06F 3/0488
USPC .................... 324/658, 686, 750.17, 519, 679; 178/18.01; 345/173, 174; 327/517
See application file for complete search history.

(56) References Cited

U.S. PATENT DOCUMENTS

| | | | | |
|---|---|---|---|---|
| 4,802,096 A | * | 1/1989 | Hainsworth | G01S 17/936 318/587 |
| 7,834,847 B2 | * | 11/2010 | Boillot et al. | 345/156 |
| 2007/0241864 A1 | * | 10/2007 | Nagai | 340/10.1 |
| 2012/0095633 A1 | * | 4/2012 | Kume | B60L 15/10 701/22 |
| 2012/0327016 A1 | * | 12/2012 | Hristov | 345/174 |
| 2013/0120257 A1 | * | 5/2013 | Park | G06F 3/041 345/158 |
| 2013/0162406 A1 | * | 6/2013 | Saidj | G05B 1/00 340/10.1 |
| 2014/0306724 A1 | * | 10/2014 | Dassanayake et al. | 324/658 |

* cited by examiner

*Primary Examiner* — Tung X Nguyen
*Assistant Examiner* — Thang Le
(74) *Attorney, Agent, or Firm* — Michael A. Davis, Jr.; Frank D. Cimino

(57) ABSTRACT

A first sensor detects whether an object is within a first region that surrounds the first sensor. A second sensor detects whether the object is within a second region that surrounds the second sensor. The first and second sensors are omnidirectional capacitive electrodes. In response to the first sensor detecting that the object is not within the first region, a device determines that the object is not proximate to a particular side of the first and second sensors. In response to the first sensor detecting that the object is within the first region, and the second sensor detecting that the object is within the second region, the device determines that the object is not proximate to the particular side. In response to the first sensor detecting that the object is within the first region, yet the second sensor detecting that the object is not within the second region, the device determines that the object is proximate to the particular side.

22 Claims, 6 Drawing Sheets

METHOD AND SYSTEM FOR DETERMINING PROXIMITY OF AN OBJECT

BACKGROUND

The disclosures herein relate in general to automated systems, and in particular to a method and system for determining proximity of an object.

An omnidirectional sensor (e.g., capacitive electrode) detects an object's proximity to the sensor, but without determining a direction of such proximity. If the object is physically restricted to approach the sensor from only a single direction, then the direction of such proximity may be less important for the sensor to detect. Conversely, if the object is unrestricted to approach the sensor from various directions, then the direction of such proximity may be more important for the sensor to detect.

Other solutions may be more expensive to implement and/or less reliable than capacitive electrodes. For example, optical solutions may be sensitive to changes in ambient light, in a manner that potentially exposes those solutions to a higher risk of false detection. Radio frequency solutions can operate at higher frequencies with antenna structures that may be sensitive to polarization.

SUMMARY

A first sensor detects whether an object is within a first region that surrounds the first sensor. A second sensor detects whether the object is within a second region that surrounds the second sensor. The first and second sensors are omnidirectional capacitive electrodes. In response to the first sensor detecting that the object is not within the first region, a device determines that the object is not proximate to a particular side of the first and second sensors. In response to the first sensor detecting that the object is within the first region, and the second sensor detecting that the object is within the second region, the device determines that the object is not proximate to the particular side. In response to the first sensor detecting that the object is within the first region, yet the second sensor detecting that the object is not within the second region, the device determines that the object is proximate to the particular side.

DETAILED DESCRIPTION

Figure 1:
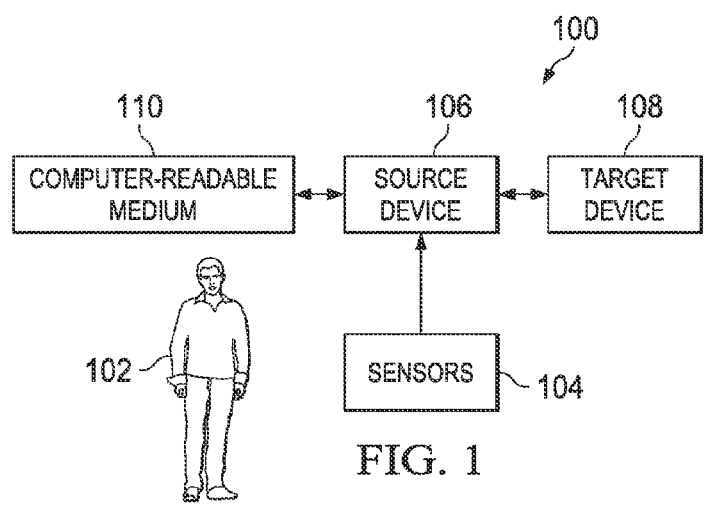
FIG. 1 is a block diagram of a system of the illustrative embodiments.

FIG. 1 is a block diagram of a system, indicated generally at 100, of the illustrative embodiments. An object 102 is any type of object (e.g., a human) that is detectable by sensors 104. In the illustrative embodiment, the sensors 104 are capacitive electrodes (e.g., electrically conductive structures, such as metal wires and/or metal sheets), which detect a change in capacitance in response to a proximity of the object 102. For example, the capacitance increases in response to a nearer proximity of the object 102, and the capacitance decreases in response to a farther proximity of the object 102.

For example, in response to an object (e.g., the object 102) becoming more proximate to one or more of the sensors 104, the sensors 104 detect a change in capacitance that is caused by such proximity. Similarly, in response to such object becoming less proximate to one or more of the sensors 104, the sensors 104 detect a change in capacitance that is caused by a lack of such proximity. In response to detecting such changes in capacitance, the sensors 104 output signals (indicative of such changes) to a source device 106.

The system 100 includes various electronic circuitry components for performing the system 100 operations, implemented in a suitable combination of software, firmware and hardware, such as one or more microprocessors, digital signal processors ("DSPs"), microcontrollers, discrete logic devices, application specific integrated circuits ("ASICs"), and field-programmable gate arrays ("FPGAs"). For example, the source device 106 is a computer and/or other electronics device (e.g., microprocessor, DSP or microcontroller), which is powered by either direct current (e.g., battery) or alternating current.

The source device 106 automatically: (a) receives the signals from the sensors 104; (b) in response to those signals, determines an object's proximity to the sensors 104; and (c) in response to such determination, outputs suitable information (e.g., commands, data and/or other signals) to a target device 108, which receives such information (e.g., via a hardwired or wireless connection). In response to such information, the target device 108 automatically performs one or more operations, such as: (a) displaying such information for viewing by a human user; (b) performing an electromechanical operation; and/or (c) outputting responsive information (e.g., acknowledgements and/or other signals) to the source device 106, which receives such responsive information (e.g., via such network connection). In one example, in response to the source device 106 determining that an object is sufficiently proximate to the sensors 104, the source device 106 outputs signals for causing the target device 108 to perform an operation.

The source device 106 performs its operations in response to instructions of computer-readable programs, which are stored on a computer-readable medium 110 (e.g., hard disk drive, nonvolatile flash memory card, and/or other storage device). Also, the computer-readable medium 110 stores data for operations of the source device 106. In one embodiment, the sensors 104, the source device 106 and the computer-readable medium 110 are installed on a printed circuit board ("PCB"), which is housed integrally with the target device 108 in a mechanical structure, so that the sensors 104 are implemented as traces on the PCB.

Figure 2:
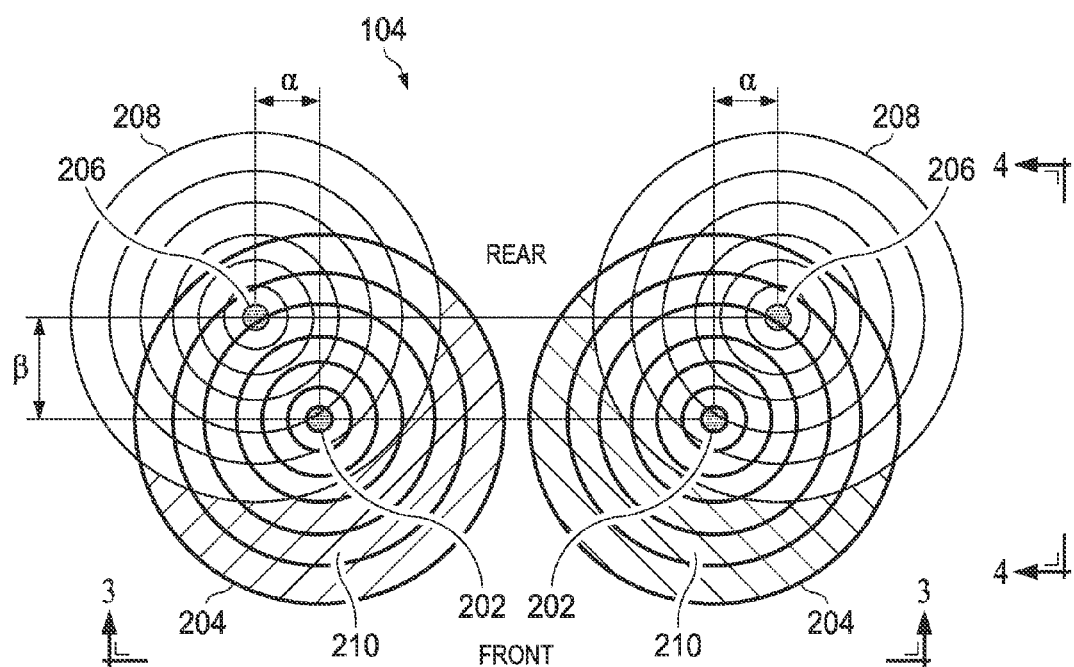
FIG. 2 is a plan view of a section of a first example arrangement of sensors of the system of FIG. 1.
Figure 3:
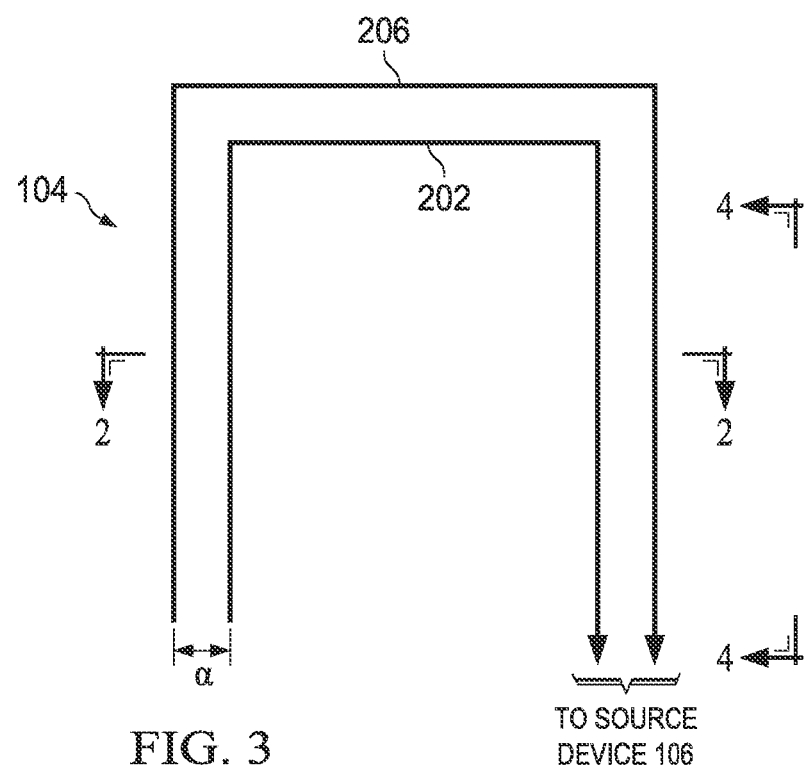
FIG. 3 is an elevational view of the first example arrangement, taken along a line 3-3 of FIG. 2.
Figure 4:
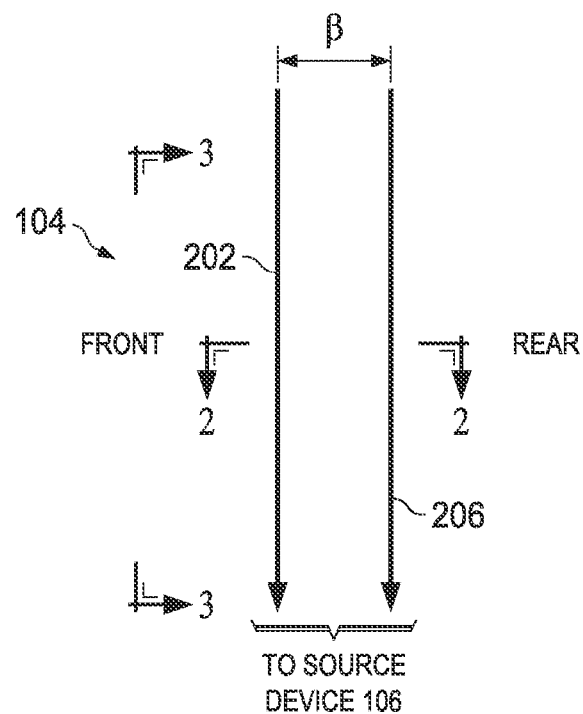
FIG. 4 is a side view of the first example arrangement, taken along a line 4-4 of FIG. 2.

FIG. 2 is a plan view of a section of a first example arrangement of the sensors 104. FIG. 3 is an elevational view of the first example arrangement, taken along a line 3-3 of FIG. 2. FIG. 4 is a side view of the first example arrangement, taken along a line 4-4 of FIG. 2.

In the first example arrangement of FIGS. 2, 3 and 4: (a) a sensitivity of an omnidirectional sensor 202 is suitable for detecting an object's proximity within a region 204 that concentrically surrounds an axis of the sensor 202; and (b) a sensitivity of an omnidirectional sensor 206 is suitable for detecting the object's proximity within a region 208 that concentrically surrounds an axis of the sensor 206. As shown in FIGS. 2, 3 and 4: (a) the sensors 202 and 206 are frame-shaped capacitive electrodes; and (b) the regions 204 and 208 partially overlap with one another.

In the first example arrangement of FIGS. 2, 3 and 4: (a) the source device 106 automatically receives the signals from the sensors 202 and 206; (b) in response to the object being sensed by the sensor 202 within the region 204, yet being unsensed by the sensor 206 within the region 208 (e.g., the sensor 206 detecting that the object is not within the region 208), the source device 106 determines that the object is sufficiently proximate to the sensors 104 within a shaded region 210; (c) otherwise, the source device 106 determines that the object is insufficiently proximate to the sensors 104 within both regions 204 and 208, within neither of the regions 204 and 208, or within only the region 208; and (d) in response to such determination, the source device 106 outputs suitable information (e.g., commands, data and/or other signals) to the target device 108, which receives such information.

In one example: (a) in response to the source device 106 determining that the object is sufficiently proximate to the sensors 104 (e.g., in response to the source device 106 determining that the object is located within the shaded region 210), the source device 106 outputs signals for causing the target device 108 to perform an operation; and (b) conversely, in response to the source device 106 determining that the object is insufficiently proximate to the sensors 104 (e.g., in response to the source device 106 determining that the object is located within both regions 204 and 208, within neither of the regions 204 and 208, or within only the region 208), the target device 108 does not perform such operation.

For other implementations, a size and/or shape and/or position of the shaded region 210 may be adapted by suitably adjusting respective sensitivities (e.g., detection thresholds) and/or shapes and/or positions of the sensors 202 and/or 206, so that respective sizes and/or shapes and/or positions of the regions 204 and/or 208 are likewise adjusted (e.g., respective sizes different from one another). Accordingly, by determining whether the object is located within the shaded region 210 (which is located on a front side of the sensors 104), the source device 106 determines whether the object is proximate to the front side instead of a different side (e.g., rear side) of the sensors 104. In that manner, the source device 106 determines a direction of the object's proximity to the sensors 104 (e.g., whether the object is located within the shaded region 210 on the front side of the sensors 104), even though each of the sensors 202 and 206 is omnidirectional.

Figure 5:
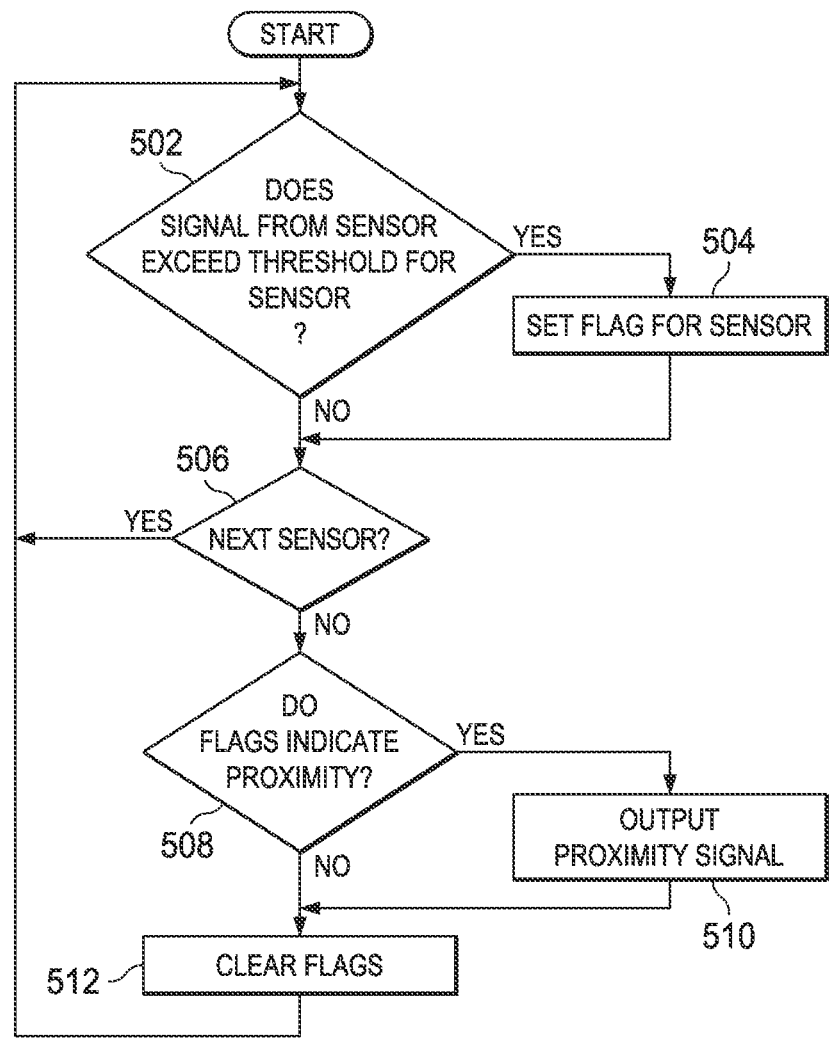
FIG. 5 is a flowchart of an operation that a source device of FIG. 1 automatically performs for determining proximity of an object.

FIG. 5 is a flowchart of an operation that the source device 106 automatically performs for determining proximity of an object. Each one of the sensors 104 ("particular sensor") has: (a) a respective detection threshold for detecting an object's proximity within a specified region that surrounds the particular sensor (e.g., within the region 204 that concentrically surrounds an axis of the sensor 202); and (b) a respective binary flag within the source device 106. If the particular sensor's respective binary flag is set (e.g., to a logical 1 state), then it indicates that the source device 106 is then-currently detecting an object's proximity within the specified region that surrounds the particular sensor. Conversely, if the particular sensor's respective binary flag is cleared (e.g., to a logical 0 state), then it indicates that the source device 106 is not then-currently detecting an object's proximity within the specified region that surrounds the particular sensor.

Initially, the source device 106 clears the respective binary flags for all of the sensors 104. At a step 502, for the particular sensor, the source device 106 determines whether signals from the particular sensor exceed the particular sensor's respective detection threshold. In response to the source device 106 determining that signals from the particular sensor exceed the particular sensor's respective detection threshold, the operation continues from the step 502 to a step 504, at which the source device 106 sets the particular sensor's respective binary flag. After the step 504, the operation continues to a step 506.

Conversely, in response to the source device 106 determining that signals from the particular sensor do not exceed the particular sensor's respective detection threshold, the operation continues from the step 502 directly to the step 506. At the step 506, the source device 106 determines whether signals have been so determined from all of the sensors 104 (since the source device 106 most recently cleared the respective binary flags for all of the sensors 104). In response to the source device 106 determining that signals have not been so determined from all of the sensors 104 (since the source device 106 most recently cleared the respective binary flags for all of the sensors 104), the source device 106 designates a next one of the sensors 104 as the particular sensor, and the operation returns from the step 506 to the step 502.

Conversely, in response to the source device 106 determining that signals have been so determined from all of the sensors 104 (since the source device 106 most recently cleared the respective binary flags for all of the sensors 104), the operation continues from the step 506 to a step 508. At the step 508, the source device 106 determines whether the respective binary flags collectively indicate that an object is sufficiently proximate to the sensors 104. In the example of FIGS. 2, 3 and 4, an object is sufficiently proximate to the sensors 104 (e.g., within the shaded region 210) if: (a) the respective binary flag of the sensor 202 is set; and (b) the respective binary flag of the sensor 206 is cleared. Otherwise, in the example of FIGS. 2, 3 and 4, the object is insufficiently proximate to the sensors 104.

In response to the source device 106 determining that the respective binary flags collectively indicate that an object is sufficiently proximate to the sensors 104, the operation continues from the step 508 to a step 510. At the step 510, the source device 106 outputs a proximity signal (along with other suitable information) to the target device 108, which performs one or more operations in response thereto, as discussed hereinabove in connection with FIGS. 1-4. After the step 510, the operation continues to a step 512.

Conversely, in response to the source device 106 determining that the respective binary flags collectively indicate that the object is insufficiently proximate to the sensors 104, the operation continues from the step 508 directly to the step 512. At the step 512, the source device 106 clears the respective binary flags for all of the sensors 104, and the operation returns to the step 502.

Figure 6:
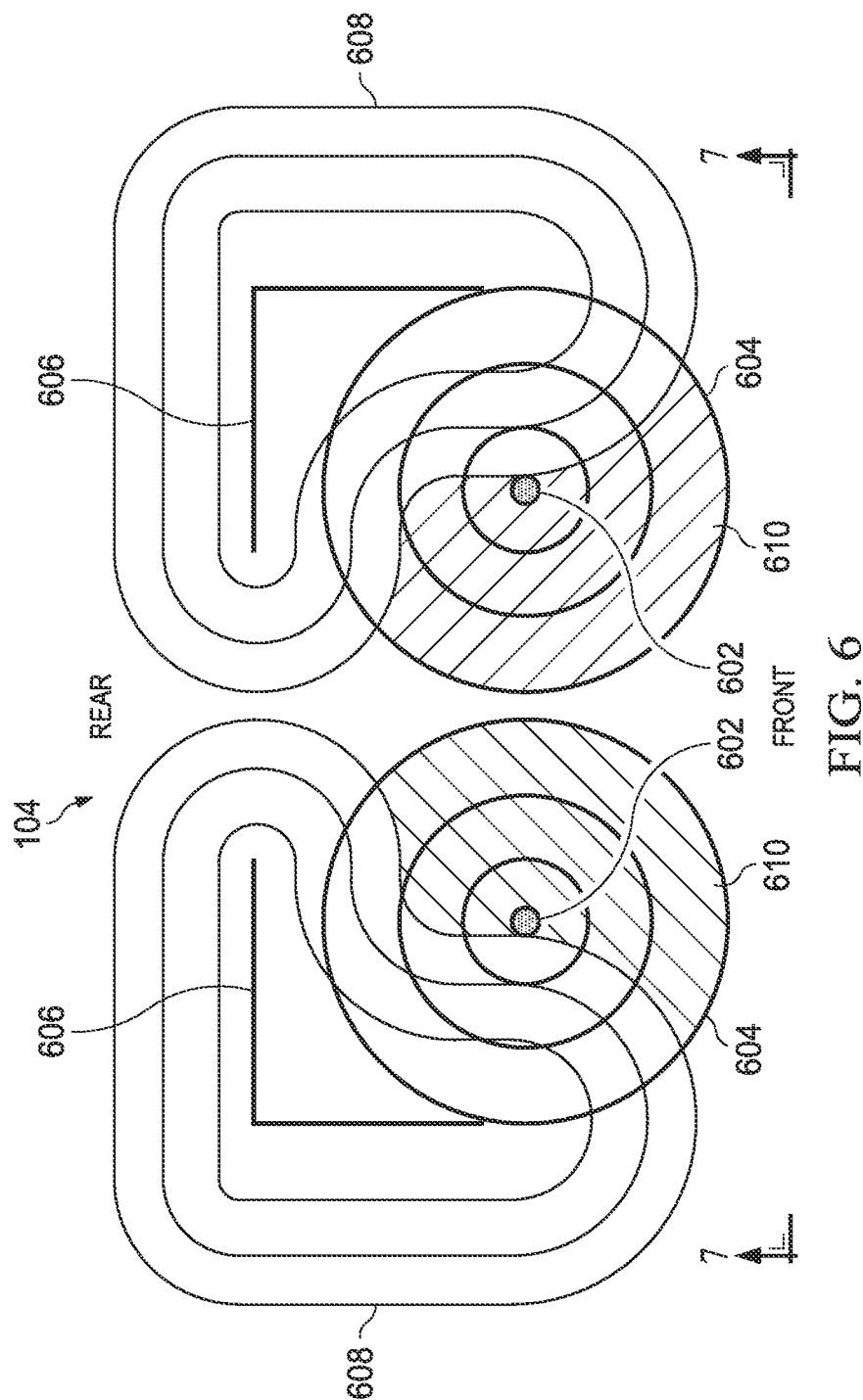
FIG. 6 is a plan view of a section of a second example arrangement of sensors of the system of FIG. 1.
Figure 7:
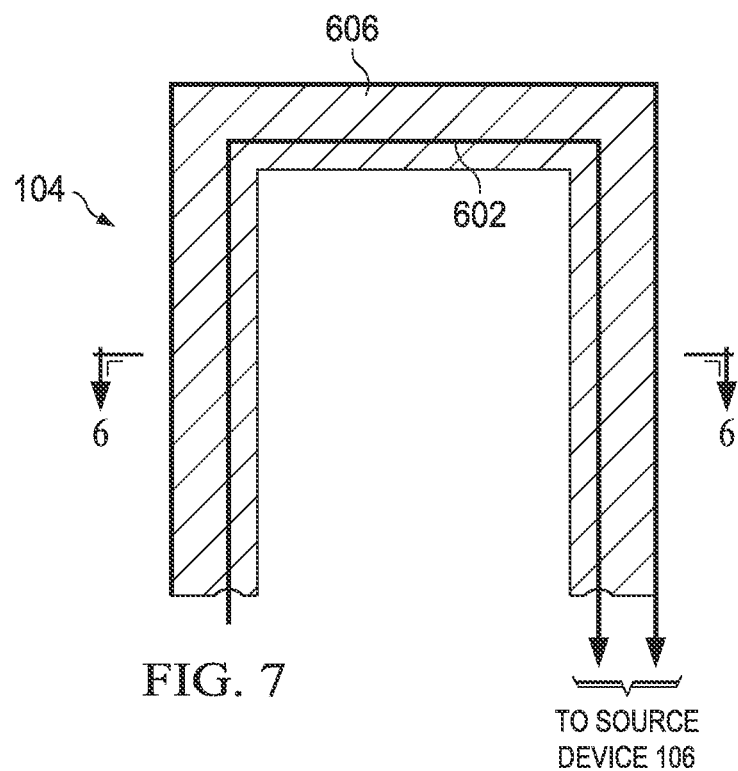
FIG. 7 is an elevational view of the second example arrangement, taken along a line 7-7 of FIG. 6.

FIG. 6 is a plan view of a section of a second example arrangement of the sensors 104. FIG. 7 is an elevational view of the second example arrangement, taken along a line 7-7 of FIG. 6.

In the second example arrangement of FIGS. 6 and 7: (a) a sensitivity of an omnidirectional sensor 602 is suitable for detecting an object's proximity within a region 604 that concentrically surrounds an axis of the sensor 602; and (b) a sensitivity of an omnidirectional sensor 606 is suitable for detecting the object's proximity within a region 608 that equidistantly surrounds various sides of the sensor 606. As shown in FIGS. 6 and 7: (a) the sensors 602 and 606 are frame-shaped capacitive electrodes; and (b) the regions 604 and 608 partially overlap with one another.

In the second example arrangement of FIGS. 6 and 7: (a) the source device 106 automatically receives the signals from the sensors 602 and 606; (b) in response to the object being sensed by the sensor 602 within the region 604, yet being unsensed by the sensor 606 within the region 608, the source device 106 determines that the object is sufficiently proximate to the sensors 104 within a shaded region 610; (c) otherwise, the source device 106 determines that the object is insufficiently proximate to the sensors 104 within both regions 604 and 608, within neither of the regions 604 and 608, or within only the region 608; and (d) in response to such determination, the source device 106 outputs suitable information to the target device 108, which receives such information, as discussed hereinabove in connection with FIGS. 1-5.

For other implementations, a size and/or shape and/or position of the shaded region 610 may be adapted by suitably adjusting respective sensitivities (e.g., detection thresholds) and/or shapes and/or positions of the sensors 602 and/or 606, so that respective sizes and/or shapes and/or positions of the regions 604 and/or 608 are likewise adjusted. Accordingly, by determining whether the object is located within the shaded region 610 (which is located on a front side of the sensors 104), the source device 106 determines whether the object is proximate to the front side instead of a different side (e.g., rear side) of the sensors 104. In that manner, the source device 106 determines a direction of the object's proximity to the sensors 104 (e.g., whether the object is located within the shaded region 610 on the front side of the sensors 104), even though each of the sensors 602 and 606 is omnidirectional.

Figure 8:
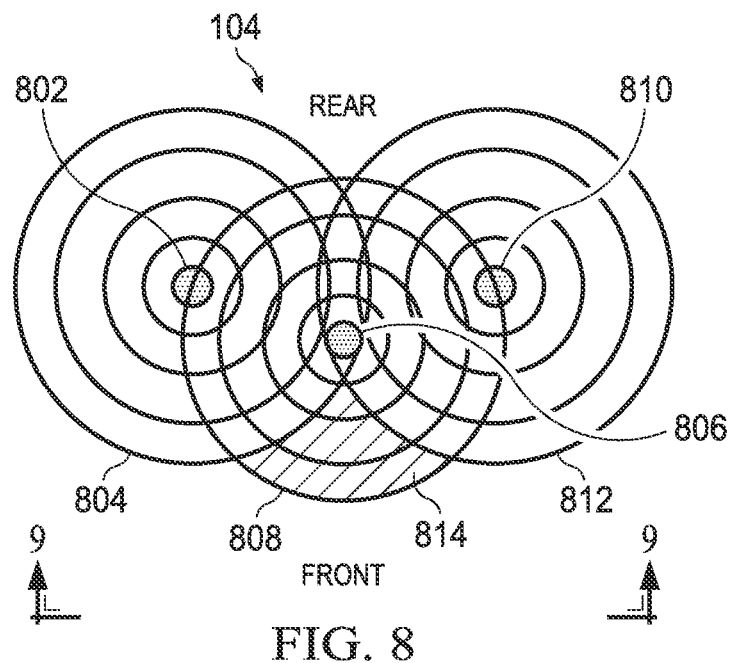
FIG. 8 is a plan view of a section of a third example arrangement of sensors of the system of FIG. 1.
Figure 9:
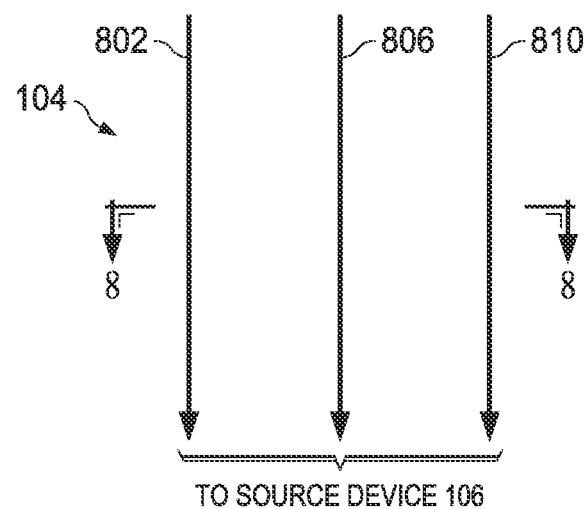
FIG. 9 is an elevational view of the third example arrangement, taken along a line 9-9 of FIG. 8.

FIG. 8 is a plan view of a section of a third example arrangement of the sensors 104. FIG. 9 is an elevational view of the third example arrangement, taken along a line 9-9 of FIG. 8.

In the third example arrangement of FIGS. 8 and 9: (a) a sensitivity of an omnidirectional sensor 802 is suitable for detecting an object's proximity within a region 804 that concentrically surrounds an axis of the sensor 802; (b) a sensitivity of an omnidirectional sensor 806 is suitable for detecting the object's proximity within a region 808 that concentrically surrounds an axis of the sensor 806; and (c) a sensitivity of an omnidirectional sensor 810 is suitable for detecting the object's proximity within a region 812 that concentrically surrounds an axis of the sensor 810. As shown in FIGS. 8 and 9: (a) the sensors 802, 806 and 810 are line-shaped capacitive electrodes; and (b) the regions 804, 808 and 812 partially overlap with one another.

In the third example arrangement of FIGS. 8 and 9: (a) the source device 106 automatically receives the signals from the sensors 802, 806 and 810; (b) in response to the object being sensed by the sensor 806 within the region 808, yet being unsensed by the sensors 802 and 810 within the regions 804 and 812 respectively, the source device 106 determines that the object is sufficiently proximate to the sensors 104 within a shaded region 814; (c) otherwise, the source device 106 determines that the object is insufficiently proximate to the sensors 104 within the region 808 and at least one of the regions 804 and 812, within none of those regions, or within only the region 804 or the region 812; and (d) in response to such determination, the source device 106 outputs suitable information to the target device 108, which receives such information, as discussed hereinabove in connection with FIGS. 1-5.

For other implementations, a size and/or shape and/or position of the shaded region 814 may be adapted by suitably adjusting respective sensitivities (e.g., detection thresholds) and/or shapes and/or positions of the sensors 802, 806 and/or 810, so that respective sizes and/or shapes and/or positions of the regions 804, 808 and/or 812 are likewise adjusted. Accordingly, by determining whether the object is located within the shaded region 814 (which is located on a front side of the sensors 104), the source device 106 determines whether the object is proximate to the front side instead of a different side (e.g., rear side) of the sensors 104. In that manner, the source device 106 determines a direction of the object's proximity to the sensors 104 (e.g., whether the object is located within the shaded region 814 on the front side of the sensors 104), even though each of the sensors 802, 806 and 810 is omnidirectional.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by at least one device for determining proximity of an object, the method comprising:

with a first sensor, detecting whether the object is within a first region that surrounds the first sensor;

with a second sensor, detecting whether the object is within a second region that surrounds the second sensor, wherein the first and second sensors are omnidirectional capacitive electrodes, and wherein the object is unrestricted to approach the first and second sensors from front and rear sides of the first and second sensors;

in response to the first sensor detecting that the object is not within the first region, determining that the object is not proximate to a particular side of the first and second sensors, wherein the particular side is one of the front and rear sides;

in response to the first sensor detecting that the object is within the first region, and the second sensor detecting that the object is within the second region, determining that the object is not proximate to the particular side; and in response to the first sensor detecting that the object is within the first region, yet the second sensor detecting that the object is not within the second region, determining that the object is proximate to the particular side.

2. The method of claim 1, wherein the first and second regions partially overlap with one another.

3. The method of claim 1, wherein the first and second sensors are frame-shaped.

4. The method of claim 1, wherein the first and second regions are different from one another in at least one of: size; and shape.

5. The method of claim 1, and comprising:
with a third sensor that is omnidirectional, detecting whether the object is within a third region that surrounds the third sensor.

6. The method of claim 5, wherein determining that the object is proximate to the particular side includes:
in response to the first sensor detecting that the object is within the first region, yet the second sensor detecting that the object is not within the second region, and yet the third sensor detecting that the object is not within the third region, determining that the object is proximate to the particular side.

7. The method of claim 6, wherein the first, second and third sensors are line-shaped, and wherein the first, second and third regions concentrically surround axes of the first, second and third sensors respectively.

8. The method of claim 6, wherein the first, second and third regions partially overlap with one another.

9. The method of claim 1, and comprising:
in response to determining that the object is proximate to the particular side, outputting a signal for causing another device to perform an operation.

10. A system for determining proximity of an object, the system comprising:
a first sensor for detecting whether the object is within a first region that surrounds the first sensor;
a second sensor for detecting whether the object is within a second region that surrounds the second sensor, wherein the first and second sensors are omnidirectional capacitive electrodes, and wherein the object is unrestricted to approach the first and second sensors from front and rear sides of the first and second sensors; and
at least one device for: in response to the first sensor detecting that the object is not within the first region, determining that the object is not proximate to a particular side of the first and second sensors, wherein the particular side is one of the front and rear sides; in response to the first sensor detecting that the object is within the first region, and the second sensor detecting that the object is within the second region, determining that the object is not proximate to the particular side; and, in response to the first sensor detecting that the object is within the first region, yet the second sensor detecting that the object is not within the second region, determining that the object is proximate to the particular side.

11. The system of claim 10, wherein the first and second regions partially overlap with one another.

12. The system of claim 10, wherein the first and second sensors are frame-shaped.

13. The system of claim 10, wherein the first and second regions are different from one another in at least one of: size; and shape.

14. The system of claim 10, and comprising:
a third sensor for detecting whether the object is within a third region that surrounds the third sensor, wherein the third sensor is omnidirectional.

15. The system of claim 14, wherein determining that the object is proximate to the particular side includes:
in response to the first sensor detecting that the object is within the first region, yet the second sensor detecting that the object is not within the second region, and yet the third sensor detecting that the object is not within the third region, determining that the object is proximate to the particular side.

16. The system of claim 15, wherein the first, second and third sensors are line-shaped, and wherein the first, second and third regions concentrically surround axes of the first, second and third sensors respectively.

17. The method of claim 15, wherein the first, second and third regions partially overlap with one another.

18. The system of claim 10, wherein the at least one device is for: in response to determining that the object is proximate to the particular side, outputting a signal for causing another device to perform an operation.

19. A system for determining proximity of an object, the system comprising:
a first sensor for detecting whether the object is within a first region that surrounds the first sensor;
a second sensor for detecting whether the object is within a second region that surrounds the second sensor;
a third sensor for detecting whether the object is within a third region that surrounds the third sensor, wherein the first, second and third sensors are omnidirectional capacitive electrodes, and wherein the object is unrestricted to approach the first and second sensors from front and rear sides of the first, second and third sensors; and
at least one device for: in response to the first sensor detecting that the object is not within the first region, determining that the object is not proximate to a particular side of the first, second and third sensors, wherein the particular side is one of the front and rear sides; in response to the first sensor detecting that the object is within the first region, and the second sensor detecting that the object is within the second region, determining that the object is not proximate to the particular side; in response to the first sensor detecting that the object is within the first region, and the third sensor detecting that the object is within the third region, determining that the object is not proximate to the particular side; and, in response to the first sensor detecting that the object is within the first region, yet the second sensor detecting that the object is not within the second region, and yet the third sensor detecting that the object is not within the third region, determining that the object is proximate to the particular side.

20. The system of claim 19, wherein the first, second and third sensors are line-shaped, and wherein the first, second and third regions concentrically surround axes of the first, second and third sensors respectively.

21. The method of claim 19, wherein the first, second and third regions partially overlap with one another.

22. The system of claim 19, wherein the at least one device is for: in response to determining that the object is proximate to the particular side, outputting a signal for causing another device to perform an operation.

* * * * *